United States Patent
Kubota et al.

[11] Patent Number: 5,897,984
[45] Date of Patent: Apr. 27, 1999

[54] METHOD FOR MANUFACTURING A FLYING MAGNETIC HEAD SLIDER

[75] Inventors: Toshio Kubota, Komoro; Satoshi Kurimoto, Kisakata-machi; Hiroshi Shindo, Kisakata-machi; Satoru Takeshima, Kisakata-machi; Shingo Kamata, Nikano-machi, all of Japan

[73] Assignee: TDK Corporation, Tokyo, Japan

[21] Appl. No.: 08/781,184

[22] Filed: Jan. 9, 1997

[30] Foreign Application Priority Data

Jan. 17, 1996 [JP] Japan .................... 8-022995

[51] Int. Cl.⁶ .................................................. G03C 5/00
[52] U.S. Cl. ..................... 430/320; 430/324; 430/329; 430/313; 216/22
[58] Field of Search .................................. 430/320, 324, 430/313, 317, 329; 216/22

[56] References Cited

U.S. PATENT DOCUMENTS

| | | | |
|---|---|---|---|
| 4,564,585 | 1/1986 | Blaske et al. | 430/320 |
| 4,673,996 | 6/1987 | White | 360/103 |
| 4,870,519 | 9/1989 | White | 360/103 |
| 5,329,689 | 7/1994 | Azuma et al. | 216/22 |

FOREIGN PATENT DOCUMENTS

| | | |
|---|---|---|
| 499473 A2 | 8/1992 | European Pat. Off. . |
| 640957 A1 | 3/1995 | European Pat. Off. . |
| 60-242548 | 12/1985 | Japan . |
| 5258498 | 10/1993 | Japan . |
| 06325340 | 11/1994 | Japan . |
| 6-325340 | 11/1994 | Japan . |

OTHER PUBLICATIONS

Patent Abstracts of Japan, vol. 18, No. 156 (P–1710), 1994, JP 5–325161 A (Hitachi Ltd.).

*Primary Examiner*—Maria Nuzzolillo
*Assistant Examiner*—Laura Weiner
*Attorney, Agent, or Firm*—Collard & Roe, P.C.

[57] ABSTRACT

A method for manufacturing a flying type magnetic head slider includes an ion etching step for shaping a surface of the slider facing to a magnetic information medium to form a predetermined pattern by using an ion etching method, a step of forming a protection layer of an organic material to cover at least one face of the slider on which at least one electromagnetic transducer element is formed, by injecting the organic material to the at least one face of the slider from a ink jet type printer head, and a step of removing the protection layer of the organic material. The protection layer forming step is executed before the ion etching step, whereas the protection layer removing step is executed after the ion etching step.

6 Claims, 3 Drawing Sheets

METHOD FOR MANUFACTURING A FLYING MAGNETIC HEAD SLIDER

FIELD OF THE INVENTION

The present invention relates to a method for manufacturing a flying type magnetic head slider, particularly to a slider manufacturing method including a process for shaping a surface of the slider facing to a magnetic information medium to form a predetermined pattern by using an ion etching method.

DESCRIPTION OF THE RELATED ART

A flying type magnetic head slider carries at least one electromagnetic (read/write) transducer element at its trailing end face and generates in operation a force of air-bearing due to air flow between the slider surface (Air Bearing Surface, ABS) and the surface of a rapidly moving magnetic medium such as a rotating magnetic disk. By balancing this air-bearing force with a spring force applied to the slider from the suspension, a flying height of this slider can be adjusted to an appropriate value.

When such slider is attached to one end portion of a swing-type arm rotatable around its other end portion, the flying height will varies as the slider moves over the disk surface due to variations of the relative speed of the slider with respect to the disk surface and due to variations of skew angle of the slider. A TPC (Traverse Pressurization Contour) slider for keeping a constant flying height over the disk surface is known and described in, for example, U.S. Pat. No. 4,673,996 issued to J. W. White on Jun. 16, 1987 and U.S. Pat. No. 4,870,519 issued to J. W. White on Sep. 26, 1989. The TPC slider of these patents has an ABS with a notched recess having a very small depth along each side edge of the ABS to produce traverse pressurization so as to compensate the variations of relative speed and of the skew angle.

A negative pressure slider with a recess partially formed on the ABS to produce a negative pressure which will attract the slider toward the rotating disk surface is also known and described in, for example, U.S. Pat. No. 4,564,585 issued to P. S. Blaske et al. on Jan. 14, 1986. This negative pressure slider provides a negative pressure force based upon the air flow between the rotating disk surface and the ABS to decrease the spring biased force applied to the slider from the suspension causing frictional wear that occurs between the disk surface and the slider during start and stop operations of the disk to reduce.

A shaped rail forming technique for shaping a part of the ABS of the rail to form a predetermined pattern which may be similar to that of the above-mentioned notched shallow recess of the TPC slider so as to improve the dynamic flying characteristics of the slider is also known.

In general, the notched recess of the TPC slider, the recess of the negative pressure slider or the shaped rail has been formed by grooving the ABS of a bar with a plurality of thin film electromagnetic transducer elements aligned along the bar so as to form the flying rails, and then by executing an ion etching (ion milling) process with respect to the formed rails. Since these recesses or shaped rail require a very shallow and extremely highly precise pattern, it is necessary to use the ion etching process for forming them.

However, if the ion etching process is used for shaping the slider surface, undesirable materials such as mixture of etching mask material and/or milling jig material are produced and these produced undesirable materials may be re-attached to side faces of the slider. It is not easy to remove these re-attached materials from the slider side faces. Furthermore, since the electromagnetic transducer element and its bonding pads are disposed on the trailing end face of the slider, the undesirable materials re-attached thereto will cause a large problem. For example, if re-attached on the pads, electrical bonding with respect to the pads becomes impossible.

In order to solve the aforementioned problem, the applicant of this application has already proposed a method for protecting the slider face from re-attachment of the ion etched material, by covering the trailing end face on which formed is at least one electromagnetic transducer element with a Cu film, and by removing this Cu film using ammonium peroxide after the ion etching process (Japanese unexamined patent publication No.6(1994)-325340). It has also proposed to use a photo-resist film as the protection layer instead of the Cu film.

However, if the Cu film is used as for the protection layer, following problems will occur. First, it is necessary to prepare an expensive vacuum device for depositing the Cu layer. In addition, as Cu tends to easily alloy with Au which is in general used to form the pads, the pads may rust. Also, it will be very difficult to completely remove the Cu film not only on the pads but also on the remaining regions of the side faces of the slider. Furthermore, in order to remove the protection layer made of Cu, it is necessary to provide a special removal liquid such as ammonium peroxide which will never be utilized in another processes for manufacturing the slider causing the number of the manufacturing processes to increase.

If the photo-resist film is used as for the protection layer, a large number of manufacturing processes such as alignment process, application or deposition process, exposition process and development process for forming the protection layer of liquid-state resist or film type resist have to be additionally required, and also many devices for carrying out these additional processes are necessary to prepare.

SUMMARY OF THE INVENTION

It is therefore an object of the present invention to provide a method for manufacturing a flying type magnetic head slider, whereby formation and removal of a protection layer for preventing an electromagnetic transducer element formed face of the slider from re-attachment of the ion etched material can be easily executed with a lower cost and without subjecting bad influence upon the electromagnetic transducer element.

According to the present invention, a method for manufacturing a flying type magnetic head slider includes an ion etching step for shaping a surface of the slider facing to a magnetic information medium to form a predetermined pattern by using an ion etching method, a step of forming a protection layer of an organic material to cover at least one face of the slider on which at least one electromagnetic transducer element is formed, by injecting the organic material to at least the above-mentioned one face of the slider from a ink jet type printer head, and a step of removing the protection layer of the organic material. The protection layer forming step is executed before the ion etching step, whereas the protection layer removing step is executed after the ion etching step.

Since the organic material is injected from the ink jet type printer head to at least the electromagnetic transducer element forming face so as to form the protection layer for covering this face, formation of the protection layer can be very easily executed with lower cost and shorter time. Also, since the protection layer is formed without contacting to the slider face, no damage such as scratches will be presented on the slider face.

It is preferred that the protection layer removing step includes a step of removing the protection layer by means of a solvent which can dissolve the organic material. Since the protection layer is dissolved by the solvent, removal of the protection layer can be easily executed with lower cost.

The solvent which can dissolve the organic material may be made of acetone or MEK (Methyl Ethyl Ketone). This is because acetone and MEK can be easily obtained and will dry in short time. Of course, in this case, the protection layer has to be made of an organic material which can be dissolved by acetone or MEK.

It is also preferred that the organic material of the protection layer is made of ink material. By using the ink material as for the protection layer, it is possible to easily watch how the protection layer is formed.

Preferably, the ion etching step includes a step of forming a resist layer on the surface of the slider to be ion-etched, and wherein the protection layer removing step includes a step of removing both the protection layer and the resist layer. Accordingly, no additional process will be needed.

Further objects and advantages of the present invention will be apparent from the following description of the preferred embodiments of the invention as illustrated in the accompanying drawings.

DESCRIPTION OF THE PREFERRED EMBODIMENT

Figure 1:
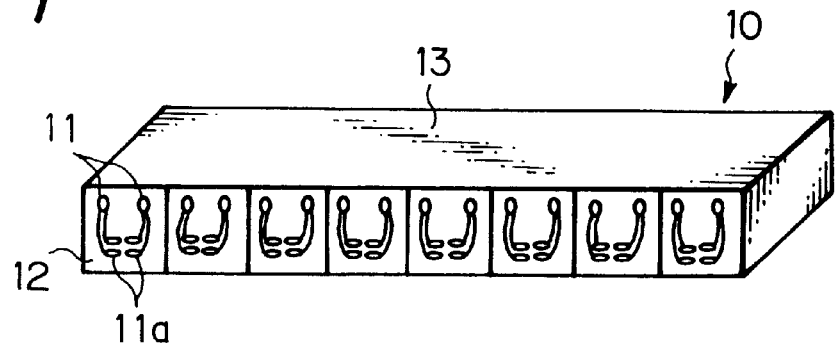
FIGS. 1 to 7 are oblique views showing various processes in a preferred embodiment of the manufacturing method according to the present invention.

On a substrate (wafer) made of ceramic material such as $Al_2O_3$—TiC, a matrix of magnetic head elements or electromagnetic (read/write) transducer elements and their input and output terminals are simultaneously formed using a thin film formation technique. Then, the substrate is cut into a plurality of rectangular sliced blocks (bars) so that each of the bars includes a plurality of magnetic head elements and of input and output terminals aligned in a single-row. In FIG. 1 which shows one of the cut and separated bars 10, reference numeral 11 denotes a plurality of electromagnetic transducer elements formed on the face 12 which will become a trailing end face of each slider, 11a denotes bonding pads of the transducer element 11, made of for example Au, and 13 denotes the air bearing surface (ABS).

Figure 2:
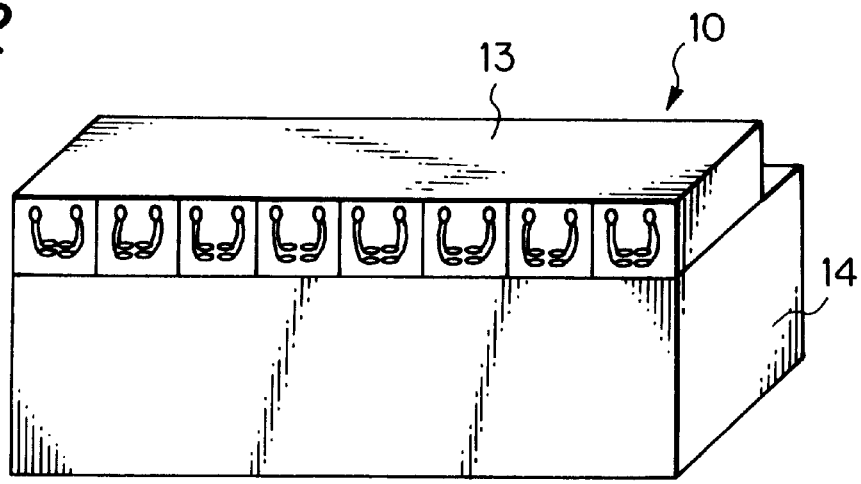
Figure 3:
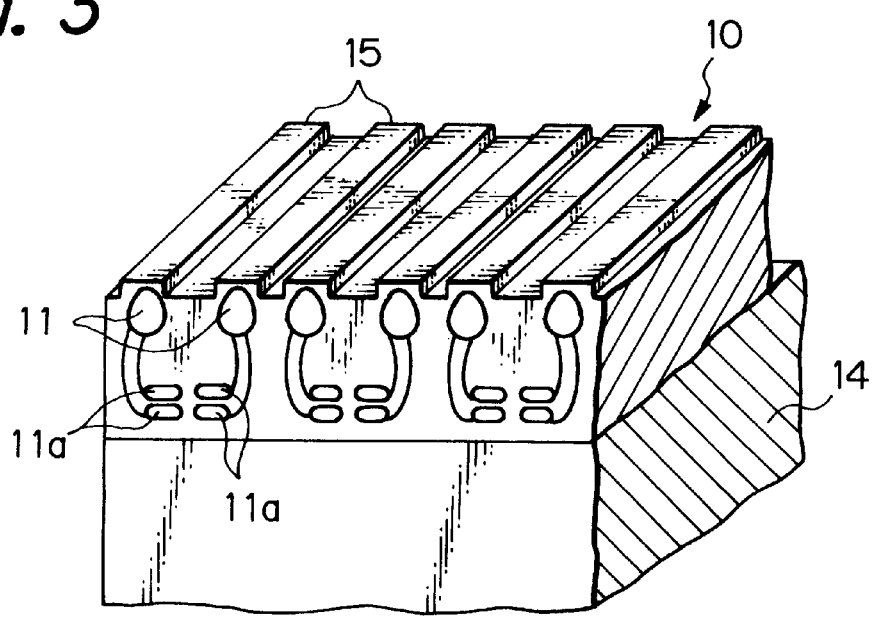

The opposite surface of the ABS 13 of the cut and separated bar 10 is adhered and attached to a plane surface of a dedicated grinding jig 14 in FIG. 2. Then, the ABS 13 of the bar 10 is ground to adjust the throat height of the magnetic heads. The ABS 13 of the throat-height adjusted bar 10 is subjected to grooving process to shape rails 15 as shown in FIG. 3. After that, the ABS 13 is polished. Then, the bar 10 is demounted from the grinding jig 14 and the demounted bar 13 is washed.

Figure 4:
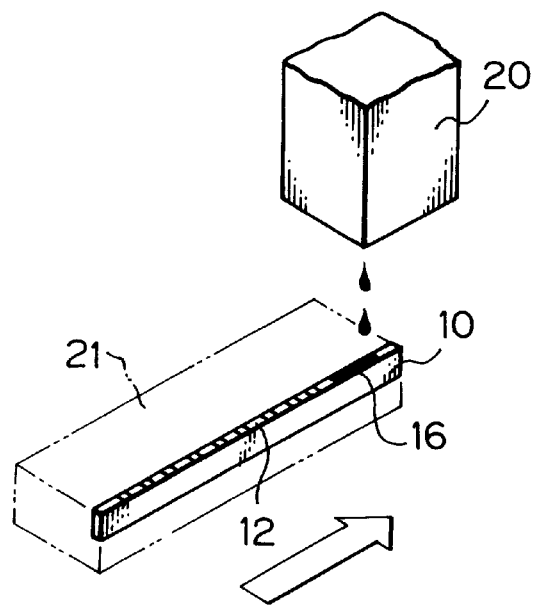

Thereafter, as shown in FIG. 4, an ink film 16 is formed as a protection layer to cover only the electromagnetic transducer element formed face 12 of the bar 10 or to cover not only this face 12 but also another any necessary face except for the ABS 13 by means of an ink jet printer (IJP) head 20.

This process for forming the protection layer can be achieved by a simple structure of the commercially available IJP head 20 which is provided with at least one ink-injection port opposed to the electromagnetic transducer element formed face 12 and of an support and movement mechanism 21 for supporting the bar 10 and moving it along an arrow shown in FIG. 4. Thanks for the IJP device, forming of the protection layer for one bar can be easily completed within a very short time of about 20 seconds. Also, the protection layer can be selectively formed on only the necessary face of the bar.

Figure 5:
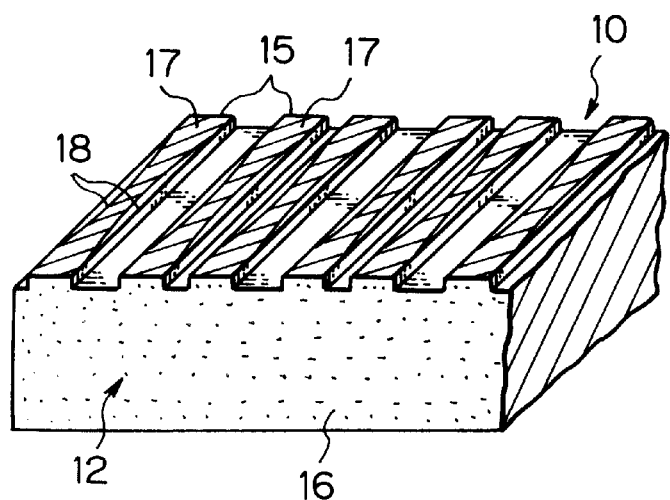

Then, the bar 10 with the protection layer 16 is attached to an another jig (not shown) and a resist film 17 with a predetermined etching pattern is formed on the ABS 13 of the rails 15 as shown in FIG. 5. This resist film with the etching pattern may be formed, for example, by laminating a dry film resist over the jig to which the bar 10 is attached, by applying an ultraviolet beam to the resist on the bar through a mask with the predetermined etching pattern, by developing the resist, and by removing the predetermined etching pattern portions 18 of the resist by means of water-washing and drying processes so that the portions 18 of the ABS 13 to be etched are exposed.

Figure 6:
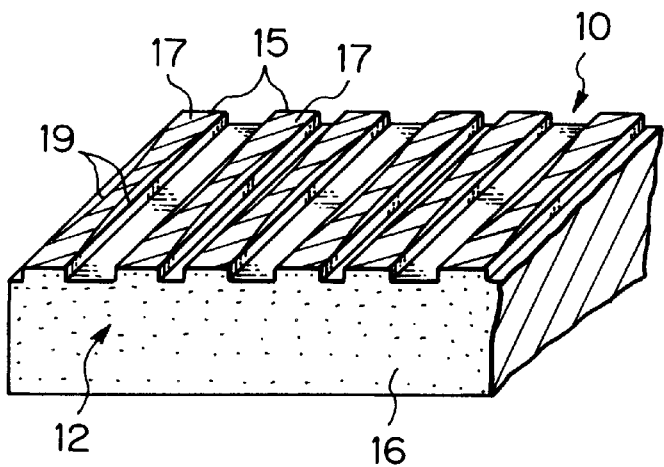

Then, the ion etching (ion milling) process for the ABS 13 on the rails 15 is carried out to obtain, as shown in FIG. 6, notched recesses 19 along both side edges of the respective ABS 13 of the rails 15 for controlling a flying characteristics of the slider. The ion beam used for this ion etching process may be perpendicular to the face to be etched, but it is preferred that the ion beam is inclined by an angle of up to 60 degrees with respect to this face and that the jig is rotated about the axis perpendicular to this face.

Figure 7:
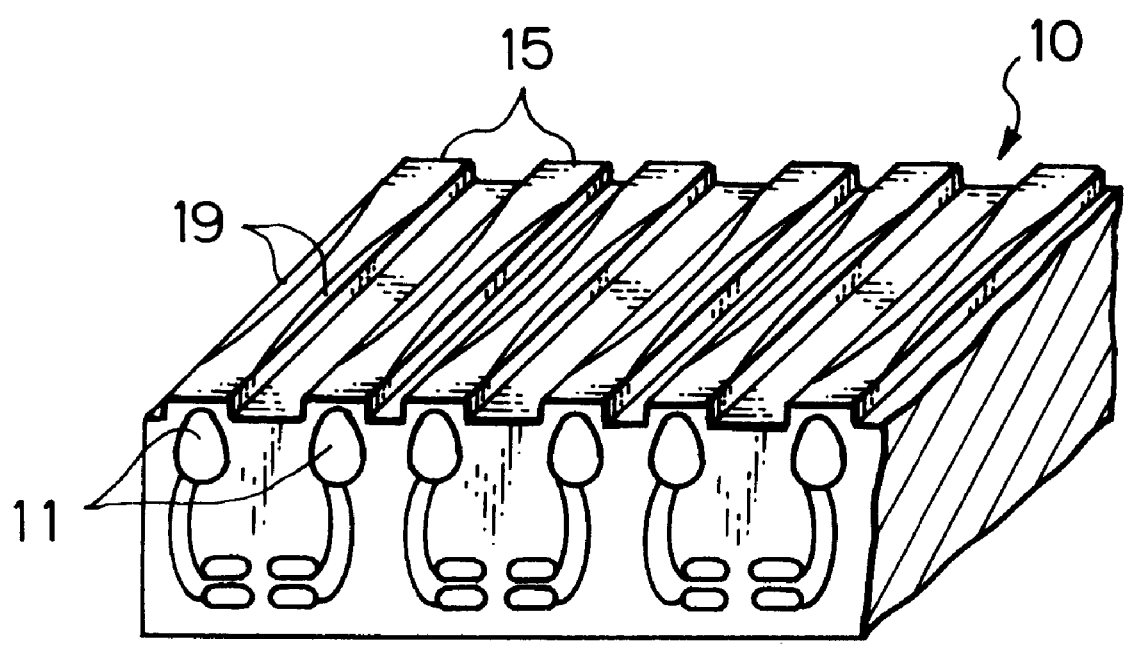

After that, the ink film 16 as well as the unnecessary resist film 17 are removed by means of solvent of acetone or MEK (Methyl Ethyl Ketone), then the bar 10 is demounted from the jig and is washed. Thus, the bar shown in FIG. 7 can be obtained.

Any organic solvent can be used if it is possible to remove both the ink film 16 and the resist film 17 and it will not attack the material of the slider itself and of another constituting members of the slider. If U-120 resist supplied from Fuji Hunt Co., Ltd. is used as for the resist film 17, this resist film can be easily removed by means of acetone. If BK2701 ink supplied from Domino Co., Ltd. is used as for the ink film 16, this film can be easily removed by means of acetone and MEK.

Thereafter, the bar is attached to a cutting jig (not shown) and then cut into a plurality of separated sliders. Then, the separated sliders are demounted from the jig and washed to provide the final sliders.

According to the aforementioned embodiment, since the ink film is formed by means of the ink jet printer head as for the protection layer which will prevent the slider face from re-attachment of the ion etched material, the protection layer can be very easily formed on a desired face of the slider. Also, since an organic solvent such as acetone which does not attack the material of the slider itself and of another constituting members of the slider is used for removal of the ink film, no bad influence will occur against any members of the slider. Furthermore, since the ink film can be removed simultaneously with the resist film 17, no additional process will be needed.

It is apparent that the above-mentioned manufacturing processes including the ink film formation process and the ion etching process can be utilized in fabricating processes of the TPC slider and the negative pressure slider.

As for material of the protection layer, any organic material can be used instead of ink material if its film can be formed by the IJP device. However, it is necessary to use an organic solvent which can easily dissolve the organic material protection layer and will not attack the material of the slider itself and of another constituting members of the slider.

The protection layer for preventing the electromagnetic transducer element formed face of the slider from re-attachment of the ion etched material can be formed on one surface or both surfaces of the wafer after the transducer elements and the pads are formed but before separating into the bars.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for manufacturing a flying magnetic head slider having a first surface and a second surface on which at least one electromagnetic transducer element is formed on said second surface, said method comprising the steps of:

injecting an organic material in liquid state, through an ink jet printer head, on said second surface of said slider to form a protection layer made from said organic material;

ion etching said first surface in a predetermined pattern, wherein said first surface faces a magnetic information medium; and removing said protection layer of said organic material from said second layer of said slider.

2. The method as claimed in claim 1, wherein said protection layer removing step includes a step of removing said protection layer by using a solvent which can dissolve said organic material.

3. The method as claimed in claim 2, whereih said solvent is made of acetone.

4. The method as claimed in claim 2, wherein said solvent is made of methyl ethyl ketone.

5. The method as claimed in claim 1, wherein said organic material in liquid state comprises an ink material.

6. The method as claimed in claim 1, wherein said ion etching step includes a step of forming a resist layer on said first surface of said slider, and wherein said protection layer removing step includes a step of removing both said protection layer and said resist layer.

* * * * *

UNITED STATES PATENT AND TRADEMARK OFFICE
CERTIFICATE OF CORRECTION

PATENT NO. : 5,897,984
DATED : April 27, 1999
INVENTOR(S) : Kubota et al

It is certified that error appears in the above-indentified patent and that said Letters Patent is hereby corrected as shown below:

On title page, item [54] and col. 1, line 2, after

"FLYING", insert --TYPE--.

Title page,
line 5 of item [75], change "Nikano-machi" to
--Nika<u>h</u>o-machi--.

Signed and Sealed this

Fifth Day of October, 1999

Attest:

Q. TODD DICKINSON

*Attesting Officer*   Acting Commissioner of Patents and Trademarks